(12) United States Patent
Kaplan et al.

(10) Patent No.: US 8,529,835 B2
(45) Date of Patent: Sep. 10, 2013

(54) BIOPOLYMER SENSOR AND METHOD OF MANUFACTURING THE SAME

(75) Inventors: David L. Kaplan, Concord, MA (US); Fiorenzo Omenetto, Wakefield, MA (US); Brian Lawrence, New York, NY (US); Mark Cronin-Golomb, Reading, MA (US); Irene Georgakoudi, Acton, MA (US)

(73) Assignee: Tufts University, Medford, MA (US)

( * ) Notice: Subject to any disclaimer, the term of this patent is extended or adjusted under 35 U.S.C. 154(b) by 780 days.

(21) Appl. No.: 12/513,441

(22) PCT Filed: Nov. 5, 2007

(86) PCT No.: PCT/US2007/083620
§ 371 (c)(1),
(2), (4) Date: May 4, 2009

(87) PCT Pub. No.: WO2008/127402
PCT Pub. Date: Oct. 23, 2008

(65) Prior Publication Data
US 2010/0070068 A1 Mar. 18, 2010

Related U.S. Application Data

(60) Provisional application No. 60/856,297, filed on Nov. 3, 2006, provisional application No. 60/935,050, filed on Jul. 24, 2007.

(51) Int. Cl.
*C12Q 1/68* (2006.01)
(52) U.S. Cl.
USPC .......................................................... 422/50
(58) Field of Classification Search
None
See application file for complete search history.

(56) References Cited

U.S. PATENT DOCUMENTS

| | | | |
|---|---|---|---|
| 4,676,640 A | 6/1987 | Briggs | |
| 4,977,902 A * | 12/1990 | Sekino et al. | 601/3 |
| 5,244,799 A * | 9/1993 | Anderson | 435/397 |
| 5,252,285 A | 10/1993 | Lock | |
| 5,427,096 A | 6/1995 | Bogusiewicz et al. | |
| 5,474,915 A * | 12/1995 | Dordick et al. | 435/72 |
| 5,512,218 A | 4/1996 | Gresser et al. | |
| 5,552,270 A * | 9/1996 | Khrapko et al. | 435/6.1 |
| 6,134,045 A | 10/2000 | Jiang et al. | |
| 6,150,491 A | 11/2000 | Akkara | |
| 6,284,418 B1 | 9/2001 | Trantolo | |
| 6,924,503 B2 * | 8/2005 | Cheng et al. | 257/40 |
| 6,989,897 B2 | 1/2006 | Chan et al. | |
| 6,992,325 B2 | 1/2006 | Huang | |
| 7,223,609 B2 | 5/2007 | Anvar et al. | |
| 7,267,958 B2 * | 9/2007 | Dordick et al. | 435/7.1 |
| 7,498,802 B2 * | 3/2009 | Takahata | 324/207.15 |
| 8,005,526 B2 | 8/2011 | Martin et al. | |
| 2001/0002417 A1 | 5/2001 | Akkara et al. | |
| 2001/0003043 A1 | 6/2001 | Metspalu et al. | |
| 2003/0203366 A1 | 10/2003 | Lim et al. | |
| 2003/0214057 A1 | 11/2003 | Huang | |
| 2004/0001299 A1 | 1/2004 | van Haaster et al. | |
| 2004/0029241 A1 * | 2/2004 | Hahn et al. | 435/174 |
| 2004/0081384 A1 * | 4/2004 | Datesman et al. | 385/12 |
| 2004/0229349 A1 | 11/2004 | Daridon | |
| 2005/0008675 A1 * | 1/2005 | Bhatia et al. | 424/426 |
| 2005/0151966 A1 | 7/2005 | Packirisamy et al. | |
| 2005/0194365 A1 | 9/2005 | Li | |
| 2005/0213868 A1 | 9/2005 | Cunningham | |
| 2005/0217990 A1 | 10/2005 | Sibbett et al. | |
| 2005/0276791 A1 * | 12/2005 | Hansford et al. | 424/93.7 |
| 2006/0024813 A1 * | 2/2006 | Warthoe | 435/287.1 |
| 2006/0042822 A1 | 3/2006 | Azeyanagi et al. | |
| 2006/0091571 A1 | 5/2006 | Akutsu et al. | |
| 2006/0111517 A1 * | 5/2006 | Feucht et al. | 525/329.4 |
| 2006/0134606 A1 | 6/2006 | Montagu | |
| 2006/0141617 A1 | 6/2006 | Desai et al. | |
| 2006/0177479 A1 | 8/2006 | Giachelli et al. | |
| 2006/0178655 A1 | 8/2006 | Santini et al. | |
| 2006/0226575 A1 | 10/2006 | Maghribi et al. | |
| 2006/0236436 A1 | 10/2006 | Li et al. | |
| 2007/0007661 A1 | 1/2007 | Burgess et al. | |
| 2007/0009968 A1 | 1/2007 | Cunningham et al. | |
| 2007/0026064 A1 | 2/2007 | Yoder et al. | |
| 2007/0031607 A1 * | 2/2007 | Dubson et al. | 427/458 |
| 2007/0042505 A1 | 2/2007 | Israel et al. | |
| 2007/0058254 A1 | 3/2007 | Kim | |

(Continued)

FOREIGN PATENT DOCUMENTS

| | | | |
|---|---|---|---|
| EP | 0 245 509 A | 11/1987 | |
| EP | 0245509 | * | 9/1992 |

(Continued)

OTHER PUBLICATIONS

Bai, J. et al., Regenerated spider silk as a new biomaterial for MEMS, Biomed Microdevices, 8:317-323 (2006).

(Continued)

*Primary Examiner* — Ann Lam
(74) *Attorney, Agent, or Firm* — Brenda Herschbach Jarell; Atsuko N. Polzin; Choate Hall & Stewart LLP

(57) ABSTRACT

A method of manufacturing a biopolymer sensor including providing a biopolymer, processing the biopolymer to yield a biopolymer matrix solution, adding a biological material in the biopolymer matrix, providing a substrate, casting the matrix solution on the substrate, and drying the biopolymer matrix solution to form a solidified biopolymer sensor on the substrate. A biopolymer sensor is also provided that includes a solidified biopolymer film with an embedded biological material.

16 Claims, 7 Drawing Sheets

(56) References Cited

U.S. PATENT DOCUMENTS

| | | | |
|---|---|---|---|
| 2007/0073130 A1 | 3/2007 | Finch et al. | |
| 2007/0178240 A1 | 8/2007 | Yamazaki et al. | |
| 2007/0233208 A1 | 10/2007 | Kurtz et al. | |
| 2007/0275030 A1* | 11/2007 | Muratoglu et al. | 424/422 |
| 2008/0019925 A1 | 1/2008 | Begleiter | |
| 2008/0038236 A1 | 2/2008 | Gimble et al. | |
| 2008/0152281 A1 | 6/2008 | Lundquist et al. | |
| 2008/0203431 A1 | 8/2008 | Garcia et al. | |
| 2008/0239755 A1 | 10/2008 | Parker et al. | |
| 2008/0288037 A1 | 11/2008 | Neysmith et al. | |
| 2009/0028910 A1* | 1/2009 | DeSimone et al. | 424/401 |
| 2009/0208555 A1 | 8/2009 | Kuttler et al. | |
| 2010/0028451 A1 | 2/2010 | Kaplan et al. | |
| 2010/0063404 A1 | 3/2010 | Kaplan et al. | |
| 2010/0120116 A1 | 5/2010 | Kaplan et al. | |
| 2011/0135697 A1* | 6/2011 | Omenetto et al. | 424/400 |
| 2012/0034291 A1* | 2/2012 | Amsden et al. | 424/443 |

FOREIGN PATENT DOCUMENTS

| | | |
|---|---|---|
| EP | 1116987 A2 | 7/2001 |
| EP | 1 166 987 A | 1/2002 |
| EP | 1467224 A1 | 10/2004 |
| JP | 60 142259 A | 7/1985 |
| JP | 60 155129 A | 8/1985 |
| JP | 01280242 A | 11/1989 |
| JP | 02086799 A | 3/1990 |
| JP | 11042106 A | 2/1999 |
| JP | 2000096490 A | 4/2000 |
| JP | 2000143472 A | 5/2000 |
| JP | 2001147301 A | 5/2001 |
| JP | 2001280242 A | 10/2001 |
| JP | 2002287377 A | 10/2002 |
| JP | 2003195001 * | 7/2003 |
| JP | 2003195001 A | 7/2003 |
| JP | 2003322729 A | 11/2003 |
| JP | 2004162209 A | 6/2004 |
| JP | 2005530983 A | 10/2005 |
| JP | 2006241450 A | 9/2006 |
| KR | 20060027113 A | 3/2006 |
| KR | 20070060822 A | 6/2007 |
| KR | 20080069553 A | 7/2008 |
| WO | WO-9315244 A1 | 8/1993 |
| WO | WO-0031752 A2 | 6/2000 |
| WO | WO 0185637 * | 11/2001 |
| WO | WO-0185637 A2 | 11/2001 |
| WO | WO-03038033 A2 | 5/2003 |
| WO | WO 2004000915 * | 12/2003 |
| WO | WO-2004000915 A2 | 12/2003 |
| WO | WO-2004092250 A1 | 10/2004 |
| WO | WO-2005012606 A2 | 2/2005 |
| WO | WO-2005019503 A2 | 3/2005 |
| WO | 2006/020507 A | 2/2006 |
| WO | WO 2008118211 * | 10/2008 |
| WO | WO-2008118211 A2 | 10/2008 |
| WO | WO-2008127403 A2 | 10/2008 |
| WO | WO-2008127405 A2 | 10/2008 |
| WO | WO 2010126640 * | 10/2008 |
| WO | WO 2008140562 * | 11/2008 |
| WO | WO 2009061823 * | 5/2009 |
| WO | WO-2009061823 A1 | 5/2009 |
| WO | WO-2010059963 A2 | 5/2010 |

OTHER PUBLICATIONS

Chrisey, D.B. et al., Laser Deposition of Polymer and Biomaterial Films, Chem. Rev 103(2):553-576 (2003).
Fukuoka T. et al., Enzymatic Polymerization of Tyrosine Derivatives. Peroxidase- and Protease-Catalyzed Synthesis of Poly(tyrosine)s with Different Structures, Biomacromolecules 3(4):768-774 (2002).
International Search Report of PCT/US2007/083600, mailed Nov. 5, 2008, 5 pages.
International Search Report of PCT/US2007/083605, mailed Dec. 15, 2008, 6 pages.
International Search Report of PCT/US2007/083620, mailed Dec. 5, 2008, 4 pages.
International Search Report of PCT/US2007/083634, mailed Nov. 5, 2008, 5 pages.
International Search Report of PCT/US2007/083639, mailed Dec. 12, 2008, 5 pages.
International Search Report of PCT/US2007/083642, mailed Nov. 5, 2008, 5 pages.
International Search Report of PCT/US2007/083646, mailed Dec. 15, 2008, 6 pages.
International Search Report of PCT/US2008/082487, mailed Feb. 27, 2009, 3 pages.
International Search Report of PCT/US2009/047751, mailed Feb. 2, 2010, 3 pages.
International Search Report of PCT/US2010/022701, mailed Mar. 31, 2010, 2 pages.
International Search Report of PCT/US2010/024004, mailed Nov. 26, 2010, 5 pages.
International Search Report of PCT/US2010/042585, mailed May 25, 2011, 8 pages.
International Search Report of PCT/US2010/047307, mailed Apr. 28, 2011, 3 pages.
International Search Report of PCT/US2010/050468, mailed Jan. 6, 2011, 3 pages.
International Search Report of PCT/US2011/028094, mailed Jul. 14, 2011, 4 pages.
International Search Report of PCT/US2011/032195, mailed Oct. 27, 2011, 3 pages.
International Search Report of PCT/US2011/041002, mailed Feb. 29, 2012, 4 pages.
IPRP of PCT/US2007/083600, mailed May 5, 2009, 6 pages.
IPRP of PCT/US2007/083605, mailed May 5, 2009, 10 pages.
IPRP of PCT/US2007/083620, mailed May 5, 2009, 6 pages.
IPRP of PCT/US2007/083634, mailed May 5, 2009, 6 pages.
IPRP of PCT/US2007/083639, mailed May 5, 2009, 6 pages.
IPRP of PCT/US2007/083642, mailed May 5, 2009, 6 pages.
IPRP of PCT/US2007/083646, mailed May 5, 2009, 10 pages.
IPRP of PCT/US2008/082487, mailed May 11, 2010, 10 pages.
IPRP of PCT/US2009/047751, mailed Dec. 18, 2010, 5 pages.
IPRP of PCT/US2010/022701, mailed Aug. 2, 2011, 5 pages.
IPRP of PCT/US2010/024004, mailed Aug. 16, 2011, 6 pages.
IPRP of PCT/US2010/042585, mailed Jan. 24, 2012, 6 pages.
IPRP of PCT/US2010/047307, mailed Mar. 6, 2012, 5 pages.
Jiang, W. et al, Silicon and Polymer Nanophotonic Devices Based on Photonic Crystals, Proceedings of the International Society of Optical Engineering, 6124(1):612410-1(2006).
Jin, I.J. et al., Water-Stable Silk Films with Reduced Beta-Sheet Content, Adv. Funct. Mater., 15:1241-1247 (2005).
Kouba et al., Fabrication of Nanoimprint Stamps for Photonic Crystals, Journal of Physics: Conference Series, 34(1):897-903 (2006).
Lawrence, B.D. et al., Bioactive silk protein biomaterial systems for optical devices, Biomacromolecules, 9:1214-1220 (2008).
Min, B.M. et al., Regenerated Silk Fibroin Nanofibers: Water Vapor-Induced Structural Changes and Their Effects on the Behavior of Normal Human Cells, Macromol. Biosci., 6(4):285-292 (2006).
Minoura, N. et al., Attachment and Growth of Cultured Fibroblast Cells on Silk Protein Matrices, J. Biomed. Mater. Res. 29(10):1215-1221 (1995).
Notification of Transmittal of International Search Report and the Written Opinion of PCT/US2011/032195, mailed Oct. 27, 2011, 2 pages.
Ramanujam, P.S., Optical Fabrication of Nano-Structured Biopolymer Surfaces, Opt. Mater. 27:1175-1177 (2005).
Tu, D. et al., A ZEP520-Lor Bilayer Resist Lift-Off Process by E-Beam Lithography for Nanometer Pattern Transfer, Proceedings of the 7th IEEE Conference on Nanotechnology, 624-627 (2007).
Verma, M.K. et al., Embedded Template-Assisted Fabrication of Complex Microchannels in Pdms and Design of a Microfluidic Adhesive, Langmuir, 22(24)10291-10295 (2006).
Wang, L. et al., Fabrication of Polymer Photonic Crystal Superprism Structures Using Polydimethylsiloxane Soft Molds Journal of Applied Physics, 101(11):114316/1-6 (2007).
Written Opinion of PCT/US2007/083600, mailed Nov. 5, 2008, 5 pages.

Written Opinion of PCT/US2007/083605, mailed Dec. 15, 2008, 9 pages.
Written Opinion of PCT/US2007/083620, mailed Dec. 5, 2008, 5 pages.
Written Opinion of PCT/US2007/083634, mailed Nov. 5, 2008, 5 pages.
Written Opinion of PCT/US2007/083639, mailed Dec. 12, 2008, 5 pages.
Written Opinion of PCT/US2007/083642, mailed Nov. 5, 2008, 5 pages.
Written Opinion of PCT/US2007/083646, mailed Dec. 15, 2008, 9 pages.
Written Opinion of PCT/US2008/082487, mailed Feb. 27, 2009, 9 pages.
Written Opinion of PCT/US2009/047751, mailed Feb. 2, 2010, 4 pages.
Written Opinion of PCT/US2010/022701, mailed Mar. 31, 2010, 4 pages.
Written Opinion of PCT/US2010/024004, mailed Nov. 23, 2010, 5 pages.
Written Opinion of PCT/US2010/042585, mailed May 25, 2011, 5 pages.
Written Opinion of PCT/US2010/047307, mailed on Apr. 28, 2011, 4 pages.
Written Opinion of PCT/US2011/032195, mailed Oct. 27, 2011, 5 pages.
Xu, P. And Kaplan, D.L., Horseradish peroxidase catalyzed polymerization of tyrosine derivatives for nanoscale surface patterning, Journal of Macromolecular Science, Part A: Pure and Applied Chemistry, 41(12):1437-1445 (2004).
Yang, L.J. et al., Fabrication of SU-8 embedded microchannels with circular cross-section, International Journal of Machine Tools & Manufacturing, 44:1109-1114 (2004).

* cited by examiner

BIOPOLYMER SENSOR AND METHOD OF MANUFACTURING THE SAME

CROSS-REFERENCE TO RELATED APPLICATIONS

This application is a 35 U.S.C. §371 National Stage of International Application No. PCT/US2007/083620 filed on Nov. 5, 2007, which designates the United States, and which claims the benefit of priority under 35 U.S.C. §119(e) of U.S. Provisional Application Ser. No. 60/856,297 filed on Nov. 3, 2006 and U.S. Provisional Application Ser. No. 60/935,050, filed on Jul. 24, 2007, the contents of which are incorporated herein by reference.

GOVERNMENT SUPPORT

The invention was made with government support under grant number EB002520 awarded by the National Institutes of Health, DMR0402849 awarded by the National Science Foundation, and FA95500410363 awarded by the Air Force Office of Scientific Research. The government has certain rights in this invention.

BACKGROUND OF THE INVENTION

1. Field of the Invention

The present invention is directed to biopolymer sensors and methods for manufacturing such sensors.

2. Description of Related Art

Many different types of sensors are used in various industries for detecting presence of particular materials such as chemical and biological compounds, and the like. Such sensors are used to detect the presence of particular materials for which the sensors were designed. For example, in the environmental science and technology field, sensors can be used to detect the presence of particular materials in the air, water, soil, and other environments and media. In addition, in the medical and biotechnology field, specialized sensors can be used to detect the presence of specific materials in living matter, such as in plants and animals.

These conventional sensors are fabricated using various different materials and methods, depending on the intended use of the sensor, including the particular material or materials that the sensor is designed to detect. However, these sensors, and the fabrication methods employed in their manufacture, generally involve significant use of non-biodegradable materials. For example, various inorganic materials, including metals and metallic compounds, are frequently used in the sensors and/or in the fabrication of such sensors.

Such metals and metallic compounds are not biodegradable and remain in the environment for extended periods of time after the sensors are removed from service and discarded. Of course, some of these materials can be recycled and reused. However, recycling also requires expenditure of natural resources, and adds to the environmental cost associated with such materials. Correspondingly, such sensors are typically discarded and remain in the environment for extended period of time, negatively impacting the environment.

Optical sensing devices have also been fabricated for various research and commercial applications. These optical sensing devices utilize devices that have similar disadvantages in that they are made of glass, fused silica, or plastic which are also not biodegradable. Common optical devices that can be used in such optical sensing devices include diffraction gratings, photonic crystals, optofluidic devices, waveguides, etc. The inorganic materials of such optical devices also remain in the environment for extended period of time and negatively impact the environment.

Therefore, there exists an unfulfilled need for sensors that are biodegradable to minimize the negative impact on the environment. There also exists an unfulfilled need for such sensors that provide additional functional features and utility that are not provided by conventional sensors.

SUMMARY OF THE INVENTION

In view of the foregoing, objects of the present invention are to provide novel sensors and methods for manufacturing such sensors.

One aspect of the present invention is to provide sensors that are made from a biopolymer.

Another aspect of the present invention is to provide a method for manufacturing such biopolymer sensors.

One advantage of the present invention is in providing biopolymer sensors that are biodegradable and minimize the negative impact on the environment.

Another advantage of the present invention is in providing sensors that are biocompatible.

Yet another advantage of the present invention is in providing sensors that have additional functional features that are not provided by conventional sensors.

In the above regard, inventors of the present invention recognized that biopolymers, and especially silk proteins, present novel structure and resulting functions. For example, from a materials science perspective, silks spun by spiders and silkworms represent the strongest and toughest natural fibers known and present various opportunities for functionalization, processing, and biocompatibility. Over five millennia of history accompany the journey of silk from a sought-after textile to a scientifically attractive fiber. As much as its features had captivated people in the past, silk commands considerable attention in this day and age because of its strength, elasticity, and biochemical properties. The novel material features of silks have recently been extended due to insights into self-assembly and the role of water in assembly. These insights, in turn, have led to new processing methods to generate hydrogels, ultrathin films, thick films, conformal coatings, three dimensional porous matrices, solid blocks, nanoscale diameter fibers, and large diameter fibers.

Silk-based materials achieve their impressive mechanical properties with natural physical crosslinks of thermodynamically stable protein secondary structures also known as beta sheets ($\beta$-sheets). Thus, no exogenous crosslinking reactions or post process crosslinking is required to stabilize the materials. The presence of diverse amino acid side chain chemistries on silk protein chains facilitates coupling chemistry for functionalizing silks, such as with cytokines, morphogens, and cell binding domains. There are no known synthetic or biologically-derived polymer systems that offer this range of material properties or biological interfaces, when considering mechanical profiles, aqueous processing, room-temperature processing, ease of functionalization, diverse modes of processing, self-forming crosslinks, biocompatibility and biodegradability.

While no other biopolymer or synthetic polymer can match the range of features outlined above for silk, some other polymers that exhibit various properties similar or analogous to silk have been identified by the inventors of the present invention. In particular, other natural biopolymers including chitosan, collagen, gelatin, agarose, chitin, polyhydroxyalkanoates, pullan, starch (amylose amylopectin), cellulose, hyaluronic acid, and related biopolymers, or a combination thereof, have been identified. In view of the above noted features of biopolymers and of silk in particular, the present invention provides novel biopolymer sensors and methods for manufacturing such sensors made from a biopolymer.

In accordance with one aspect of the present invention, a method of manufacturing a biopolymer sensor is provided. In one embodiment, the method includes providing a biopolymer, processing the biopolymer to yield a biopolymer matrix solution, embedding a biological material or other material in the biopolymer matrix, providing a substrate, casting the matrix solution with the embedded biological material on the substrate, and drying the biopolymer matrix solution with the embedded biological material to form a solidified biopolymer sensor on the substrate. Other materials may be embedded in the biopolymer or in the biopolymer matrix instead of, or in addition to biological materials, depending upon the type of sensor desired.

In one embodiment, the method may optionally include annealing the solidified biopolymer sensor and drying the annealed biopolymer sensor. The annealing of the solidified biopolymer sensor may be performed in a vacuum environment and/or in a water vapor environment. In another embodiment, the substrate may be an optical device such as a lens, a microlens array, an optical grating, a pattern generator, or a beam reshaper. In this regard, the biopolymer sensor may also be manufactured as an optical device such as a lens, a microlens array, an optical grating, a pattern generator, a beam reshaper, and other optical devices.

In accordance with still another embodiment, the biopolymer is silk, and the biopolymer matrix solution is an aqueous silk fibroin solution having approximately 1.0 wt % to 30 wt % silk, inclusive, for example, 8.0 wt % silk. In yet another embodiment, the biopolymer is chitosan, collagen, gelatin, agarose, chitin, polyhydroxyalkanoates, pullan, starch (amylose amylopectin), cellulose, hyaluronic acid, and related biopolymers, or a combination thereof.

In one embodiment, the biological material is red blood cells (hemoglobin), horseradish peroxidase, phenolsulfonphthalein, or a combination thereof. In another embodiment, the biological material is a nucleic acid, a dye, a cell, an antibody, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules, drugs, (e.g., drugs, dyes, amino acids, vitamins, antioxidants), DNA, RNA, RNAi, lipids, nucleotides, aptamers, carbohydrates, chromophores, light emitting organic compounds such as luciferin, carotenes and light emitting inorganic compounds, chemical dyes, antibiotics, antifungals, antivirals, light harvesting compounds such as chlorophyll, bacteriorhodopsin, protorhodopsin, and porphyrins and related electronically active compounds, or a combination thereof.

In another embodiment of the present invention, a method of manufacturing a biopolymer sensor is provided, including providing a biopolymer, processing the biopolymer to yield a biopolymer matrix solution, providing a substrate, casting the matrix solution on the substrate, drying the biopolymer matrix solution to form a biopolymer film on the substrate, and embedding a biological material on the solidified biopolymer film. In such an embodiment the solidified biopolymer film may be annealed and additionally dried. In addition, the annealing of the solidified biopolymer film may be performed a vacuum environment and/or in a water vapor environment.

Another aspect of the present invention is in providing a biopolymer sensor comprising a solidified biopolymer film with an embedded biological material. In one embodiment, the biopolymer sensor is a lens, a microlens array, an optical grating, a pattern generator, a beam reshaper, or the like. In another embodiment, the biopolymer of the biopolymer sensor is silk, chitosan, collagen, gelatin, agarose, chitin, polyhydroxyalkanoates, pullan, starch (amylose amylopectin), cellulose, hyaluronic acid, and related biopolymers, or a combination thereof.

In yet another embodiment, the biological material is red blood cella (hemoglobin), horseradish peroxidase, phenolsulfonphthalein, or a combination thereof. In still another embodiment, the biological material is a protein, a nucleic acid, a dye, a cell, an antibody, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules, (e.g., drugs, dyes, amino acids, vitamins, antioxidants), DNA, RNA, RNAi, lipids, nucleotides, aptamers, carbohydrates, chromophores, light emitting organic compounds such as luciferin, carotenes and light emitting inorganic compounds, chemical dyes, antibiotics, antifungals, antivirals, light harvesting compounds such as chlorophyll, bacteriorhodopsin, protorhodopsin, and porphyrins and related electronically active compounds, or a combination thereof.

These and other advantages and features of the present invention will become more apparent from the following detailed description of the preferred embodiments of the present invention when viewed in conjunction with the accompanying drawings.

DETAILED DESCRIPTION OF THE INVENTION

Initially, it is noted that in view of the superior functional characteristics and processability that were noted above, biopolymer sensors of the present invention are described herein below as being implemented with silk, which is biocompatible and biodegradable. In this regard, the silk utilized was silkworm silk. However, there are many different silks, including spider silk, transgenic silks, and genetically engineered silks, variants thereof and others, that may alternatively be used in accordance with the present invention to manufacture a biopolymer sensor. In addition, other biocompatible biodegradable polymers may be used instead of silk. For example, some biopolymers, such as chitosan, exhibit desirable mechanical properties, can be processed in water, and form generally clear films for optical applications. Other biopolymers, such as collagen, gelatin, agarose, chitin, polyhydroxyalkanoates, pullan, starch (amylose amylopectin), cellulose, hyaluronic acid, and related biopolymers, and the like, or a combination thereof, may alternatively be utilized in specific applications, and synthetic biodegradable polymers such as polylactic acid, polyglycolic acid, polyhydroxyalkanoates, and related copolymers may also be selectively used. Some of these polymers are not easily processable in water. Nonetheless, such polymers may be used by themselves, or in combinations with silk, and may be used to manufacture biopolymer sensors for specific applications.

Figure 1:
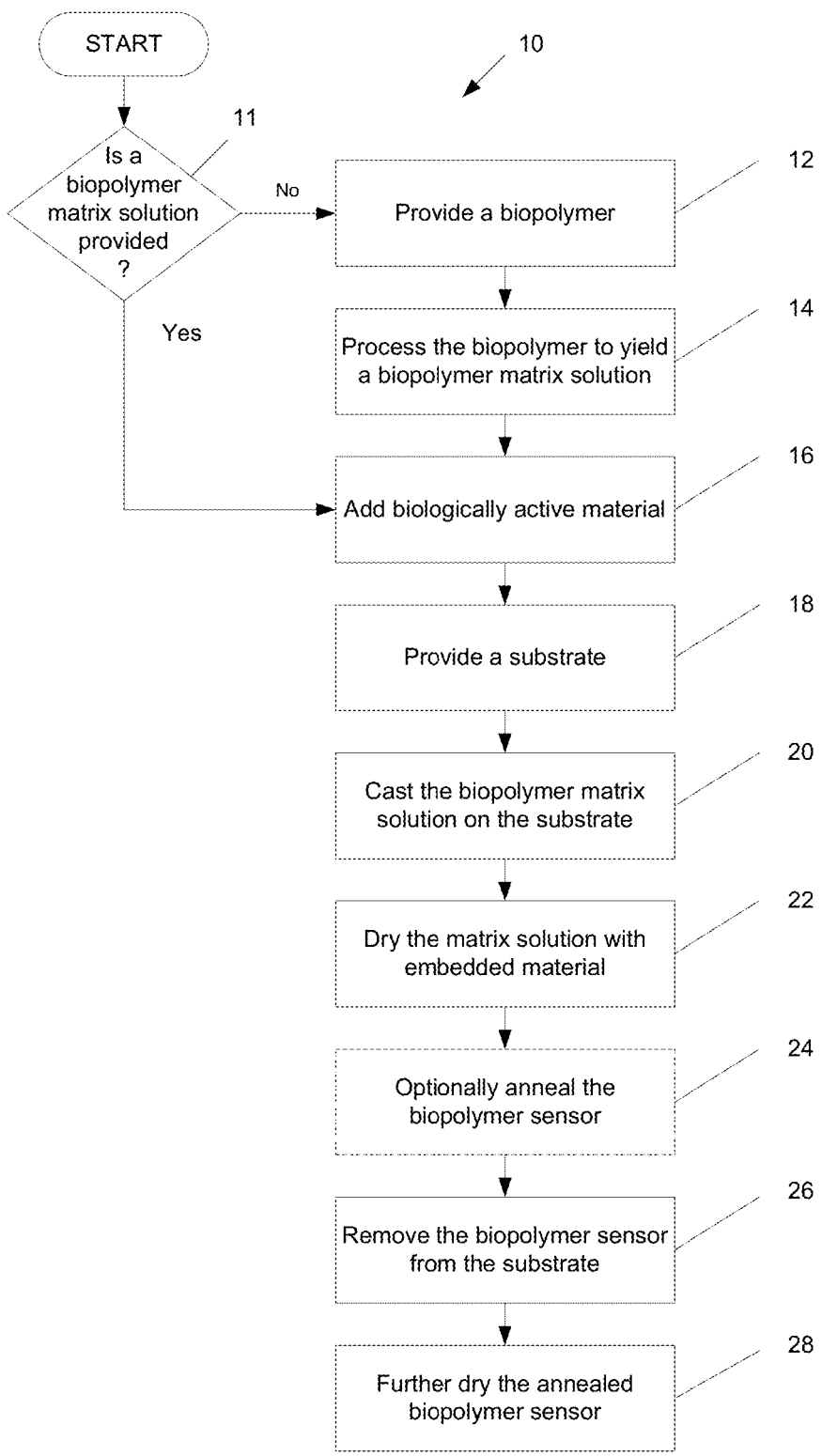
FIG. 1 is a schematic flow diagram illustrating a method for manufacturing a biopolymer sensor in accordance with one embodiment of the present invention.

FIG. 1 is a schematic flow diagram 10 showing a method of manufacturing a biopolymer sensor in accordance with one embodiment of the present invention. If a biopolymer matrix solution is present in step 11, the process proceeds to step 16 below. Otherwise, a biopolymer is provided in step 12. In the example where the biopolymer is silk, the silk biopolymer may be provided by extracting sericin from the cocoons of *Bombyx mori*. The provided biopolymer is processed to yield a biopolymer matrix solution in step 14. In one embodiment, the biopolymer matrix solution is an aqueous solution. However, in other embodiments, different solvents other than water, or a combination of solvents, may be used, depending on the biopolymer provided.

Thus, in the example of silk, an aqueous silk fibroin solution is processed in step 14. For example, an 8.0 wt % solution is used to manufacture the biopolymer sensor. Of course, in other embodiments, the solution concentrations may also be varied from very dilute (approximately 1 wt %) to very high (up to 30 wt %) using either dilution or concentration, for example, via osmotic stress or drying techniques. In this regard, other embodiments may utilize different percent weight solutions to optimize flexibility or strength of the resultant biopolymer sensor, depending on the application, while maintaining the desired sensing function. Production of aqueous silk fibroin solution is described in detail in WIPO Publication Number WO 2005/012606 entitled "Concentrated Aqueous Silk Fibroin Solution and Uses Thereof", which is herein incorporated by reference.

A biological material is then added to the biopolymer matrix solution in step 16. In the illustrated example implementation, the added biological material is a biologically active material, which is selected based on the substance desired to be detected by the resultant biopolymer sensor. In other words, the specific biologically active material that is added depends on the desired sensing function of the biopolymer sensor manufactured and the environment in which the biopolymer sensor is to be used. Throughout this application, "biological material," "biologically active material," and "organic material" may be used to denote material added to the biopolymer matrix solution to facilitate detection of substances by the resulting biopolymer sensor. Examples of the biologically active material are discussed below.

A substrate is provided in step 18 to serve as a mold in manufacturing the biopolymer sensor. In this regard, the substrate may be an optical device and may optionally include additional optical surface features on the manufactured biopolymer sensor. The aqueous biopolymer matrix solution is then cast on the substrate in step 20 in accordance with the present method.

The cast biopolymer matrix, including the added biological material, is dried in step 22 to transition the aqueous biopolymer matrix solution to the solid phase. In this regard, the aqueous biopolymer matrix solution with the biological material may be dried for a period of time such as 24 hours, and may optionally be subjected to low heat to expedite drying of the aqueous biopolymer matrix solution. Other drying techniques may also be used such as isothermal drying, roller drying, spray drying, and heating techniques. Upon drying, a biopolymer sensor with the embedded biological material is formed on the surface of the substrate. The thickness of the biopolymer film depends upon the volume of the biopolymer matrix solution (with the biological material) applied to the substrate.

Once the drying is complete and the solvent of the biopolymer matrix solution has evaporated, the biopolymer sensor with the embedded biological material may optionally be annealed in step 24. This annealing step may be performed within a water vapor environment, such as in a chamber filled with water vapor, for different periods of time depending on the material properties desired. Typical time periods may range from two hours to two days, for example. The annealing step may also be performed in a vacuum environment. The annealed biopolymer sensor with the embedded biological material is then removed from the substrate in step 26 and allowed to dry further in step 28.

The biopolymer sensor manufactured in the above-described manner has been embedded with a biological material to allow the biopolymer film to be functionalized for use as a biopolymer sensor. The biopolymer film was annealed, as well. The resulting biopolymer sensor is biodegradable. Functionalization of the biopolymer sensor can be realized by embedding antibodies, peptides, arrays of proteins or peptides, or other biopolymer or synthetic polymer materials that provide selective responses to target organisms, chemicals, or other compositions. Similarly, the biopolymer sensor may be functionalized by embedding cells, antibodies, tissues; or other suitable receptors that respond to a target material or substance in the environment.

In the above regard, the embedded biological material may include small organic molecules such as nucleic acid, a dye, a cell, an antibody an antibody, as described further in Appendix I, enzymes as described further in Appendix II, for example, peroxidase, lipase, amylose, organophosphate dehydrogenase, ligases, restriction endonucleases, ribonucleases, DNA polymerases, glucose oxidase, laccase, cells, viruses, bacterias, proteins, peptides for molecular recognition, small molecules, drugs, dyes, amino acids, vitamins, antixoxidants, plant cells, mammalian cells, and the like, DNA, RNA, RNAi, lipids, nucleotides, aptamers, carbohydrates, optically-active chromophores including beta carotene or porphyrins light emitting organic compounds such as luciferin, carotenes and light emitting inorganic compounds, chemical dyes, antibiotics, yeast, antifungals, antivirals, and complexes such as hemoglobin, electron transport chain coenzymes and redox components, light harvesting compounds such as chlorophyll, phycobiliproteins, bacteriorhodopsin, protorhodopsin, and porphyrins and related electronically active compounds, and the like or a combination thereof.

These biological materials may be used to sense environmental features, such as specific chemicals, changes in chemicals, pH, moisture vapor, redox state, metals, light, specific proteins, specific viruses, prions, and stress levels, among other targets. For example, embedded hemoglobin may be used to sense the presence of oxygen in the environment in which the sensor is used. Embedded phenol red allows the sensor to detect the pH level of the surrounding environment. Specific embedded antibodies may be used to bind with appropriate and related chemicals to sense the chemical presence in the sensor's environment. Of course, these biological materials are provided as examples only, and other materials may be used in other implementations of the biopolymer sensors in accordance with the present invention.

Alternatively, these biological materials may coat, or may be embedded, merely on a surface of the biopolymer sensor in other embodiments of the present invention. An all-water process may be preferably used to preserve the level of activity of these biological materials. In this regard, the stability of these biological materials is partially determined by the water content in the biopolymer film and the stabilization provided by the film. Of course, film additives, such as glycerol, plasticizers other than water, such as lipids, and many other polymers such as polysaccharides, may also be used in other embodiments to provide added options for biological function due to their water-holding capability.

As explained in further detail below, the above-described method provides a biodegradable, optically active, biopolymer sensor that exhibits different optical signatures and properties based on the presence of particular substances that the biopolymer sensors are designed to detect. Furthermore, the optical signatures can be enhanced by an appropriate diffractive or refractive optical structure, such as micro or nanoscale patterning on the biopolymer sensor so that the sensor is also an optical component. This design may also incorporate the effects on the optical signatures of the biological material, as well.

Patterned nanostructures can be provided on the biopolymer films, such as the silk films manufactured in the above discussed manner. In one embodiment, the surface of the substrate may be smooth so as to provide a smooth biopolymer film, and a nanopattern may be machined on the surface of the biopolymer film. The nanopattern may be machined using a laser, such as a femtosecond laser, or by other nanopattern machining techniques, including lithography techniques such as photolithography, electron beam lithography, soft lithography, and the like. Using such techniques, nanopattern features as small as 700 nm that are spaced less than 3 µm have been demonstrated as described in further detail below.

In another embodiment, the surface of the substrate itself may have an appropriate nanopattern thereon so that when the solidified biopolymer film is removed from the substrate, the biopolymer film is already formed with the desired nanopattern on the surface of the biopolymer film. In such an implementation, the substrate may be an optical device, such as a nanopatterned optical grating, or other similar optical devices, depending on the nanopattern desired on the biopolymer films. The substrate surfaces may be coated with Teflon™ and other suitable coatings to ensure even detachment after the biopolymer matrix solution transitions from the liquid to the solid phase. The ability of the biopolymer casting method using a nanopatterned substrate for forming highly defined nanopatterned structures in the resultant biopolymer films was verified, and silk films having nanostructures as small as 75 nm and RMS surface roughness of less than 5 nm have been demonstrated.

The measured roughness of cast silk film on an optically flat surface shows measured root mean squared roughness values between 2.5 and 5 nanometers, which implies a surface roughness easily less than $\lambda/50$ at a wavelength of 633 nm. Atomic force microscope images of patterned silk diffractive optics show the levels of microfabrication obtainable by casting and lifting silk films off of appropriate molds. The images show definition in the hundreds of nanometer range and the sharpness of the corners indicates the possibility of faithful patterning down to the tens of nanometers.

In particular, the material properties of certain biopolymers such as silk are well suited for patterning on the nanoscale using soft lithography techniques. With appropriate relief masks, silk films may be cast and solidified on the surface of various optical devices with the desired patterning and subsequently detached. Such regular patterning of biocompatible materials allows manufacturing of sensors that have optical features that can be used to provide photonic bandgaps and manipulate light via organic, yet mechanically robust, biopolymer sensors, thereby adding the flexibility of embedded optics to the unique versatility of the biopolymer sensor as explained in further detail below.

The structural stability and the ability to faithfully reproduce nanostructures allows the manufactures of many different diffractive optical structures or refractive micro and nano-optical structures using biopolymers, such as silk. Among the optical elements that can be readily made are gratings, micro and nano lens arrays, pattern generators, beam diffusers, beam homogenizers, and the like. Such biopolymer optical devices in accordance with the described embodiments of the present invention have a diffractive or refractive surface from casting or from machining, for example, by using femtosecond lasers. These optical devices may also be used as individual building blocks to manufacture three-dimensional biopolymer devices by stacking the individual films. In this regard, such optical devices made of biopolymers can be used as sensors themselves, without the embedded biological materials. By providing nano-patterning on the surface of such optical devices, the devices may be used to passively detect the presence of certain materials or substances that change the optical signature of the optical device.

Furthermore, the biopolymer optical devices may be functionalized by embedding biological material within the biopolymer matrix as discussed. In this fashion, the present invention allows fabrication of very specific and unique biopolymer sensors with embedded biological material, which can also be provided with diffractive or refractive, micro or nanostructured optical features.

The biopolymer sensors in accordance with the present invention can be made to be biocompatible based on the properties of the biopolymer. Using a matrix solution as discussed above, very large quantities of biopolymer sensors can be manufactured. The biopolymer sensors are both biodegradable and biocompatible. Since the biopolymer sensors in accordance with the preferred embodiment are biodegradable, they can be functionalized so that they may be dispersed in the environment, such as on land or in water, either in large volumes such as in reservoirs, streams, and lakes, or in smaller volumes such as in household tanks, taps, wells, septic systems, and the like. These biodegradable biopolymer sensors may be used to detect the presence of pathogens or contaminants by optical interrogation.

Regardless of whether the device is implemented as an embedded film or is further provided with nanopatterned optical features, the biopolymer sensor has an optical signature and properties that change when the biological material embedded in the biopolymer matrix reacts with a material of interest to be detected. Such changes in the optical signature and properties can be detected by direct optical interrogation and analysis of the biopolymer sensor, or even remotely, for example, via satellite imaging.

Experiments were conducted to validate the efficacy of the above-described biopolymer sensors and to evaluate the method for manufacturing the by fabricating various biopolymer sensors in the manner described. In particular, the relationship between the volume of 8 wt % silk concentration aqueous silk fibroin solution and the resulting silk film thickness is shown in the graph 30 of FIG. 2. The aqueous silk fibroin solution in this case was cast over a substrate surface of approximately 10 square centimeters. The X-axis shows the volume of silk solution in mL, and the Y-axis shows the thickness of the resultant film in μm.

Of course, the film properties such as thickness and biopolymer content, as well as the optical features, may be altered based on the concentration of fibroin used in the process, the volume of the aqueous silk fibroin solution deposited, and the post-deposition process for drying the cast solution to lock in the structure. Moreover, the biopolymer film properties may also be impacted by the embedding of the biological material that functionalizes the resultant film. Accurate control of these parameters is desirable to ensure the optical quality of the resultant biopolymer sensor, and to maintain various characteristics of the biopolymer sensor, such as transparency, structural rigidity, or flexibility. Furthermore, additives to the biopolymer matrix solution may be used to alter features of the biopolymer sensor such as morphology, stability, and the like, as with polyethylene glycols, collagens, and the like.

A biologically functionalized biopolymer sensor was produced in accordance with one embodiment of the present invention by embedding an organic indicator into a silk diffraction grating. In particular, a phenol red (a.k.a. phenolsulfonphthalein or PSP) doped silk matrix solution was cast onto a 600 lines/mm diffraction grating substrate, dried, and annealed in the manner described above relative to the method of FIG. 1. The resulting biopolymer sensor is a functionalized grating with diffractive optical structures on its surface. The biopolymer sensor maintains the functionality of the organic indicator embedded within the silk matrix. As described in further detail below, the functionality of the indicator has been demonstrated by dipping the fabricated biopolymer sensor into different solutions with different pH values and verifying that the optical properties are maintained.

Figures 3A, 3B, 3C, 3D:
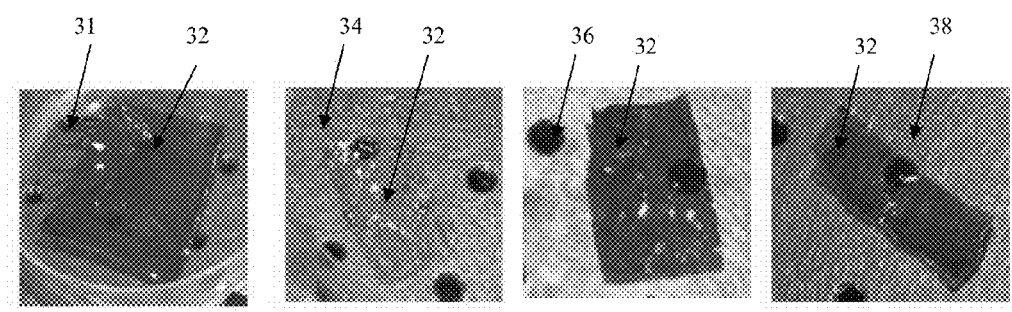
FIG. 3A is a photograph of a chromatically-tuned biopolymer sensor in accordance with one embodiment of the present invention.
FIG. 3B is a photograph of the biopolymer sensor of FIG. 3A after being exposed to a pH=4 solution.
FIG. 3C is a photograph of the biopolymer sensor of FIG. 3A after being exposed to a pH=7 solution.
FIG. 3D is a photograph of the biopolymer sensor of FIG. 3A after being exposed to a pH=10 solution.

FIGS. 3A through 3D illustrate a chromatically tuned biopolymer sensor in accordance with one embodiment of the present invention. In particular, photograph 31 of FIG. 3A shows a biopolymer sensor 32 that is fabricated as a silk optical grating embedded with a biological material, such as in the present example with phenol red. FIGS. 3B and 3C show portions of the biopolymer sensor 32 after being exposed to, and interacting with, various pH solutions. In particular, FIG. 3B is a photograph 34 showing the biopolymer sensor 32 after being exposed to a solution where the pH=4. FIG. 3C is a photograph 36 showing the biopolymer sensor 32 after being exposed to a solution where the pH=7. FIG. 3D is a photograph 38 showing the biopolymer sensor 32 after being exposed to a solution where the pH=10. As can be seen from the Figures, the biopolymer sensor 32 changes color depending on the pH of the solution, thereby demonstrating that the silk biopolymer optical grating maintains the functionality of the embedded phenol red.

The functionality of the embedded phenol red in the biopolymer sensor 32 is also maintained so that the process is reversible upon sequential dipping in different solutions with different pH levels. For instance, biopolymer sensor 32 grating may be exposed to a solution where the ph=10 to exhibit the coloration shown in photograph 38 of FIG. 3D. The biopolymer sensor 32 may then be exposed to a solution where the pH=4 to exhibit the coloration shown in photograph 34 of FIG. 3B. Thus, the illustrated embodiment of the present invention provides a biopolymer sensor 32 with optical diffractive features by the virtue of the grating structure that embeds the functionality of a pH indicator, such as phenol red, while being reusable.

Figure 4:
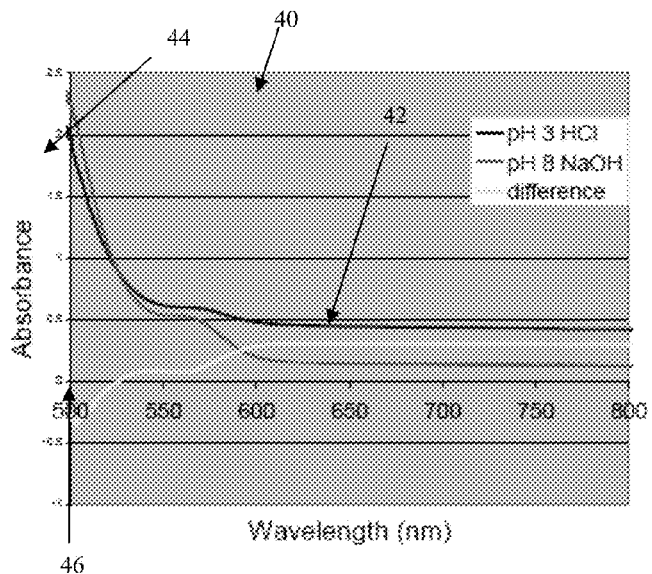
FIG. 4 is a graph illustrating the spectral signature of a biopolymer sensor embedded with phenol red when exposed to solutions of various pH levels in accordance with another embodiment of the present invention.

The graph 40 of FIG. 4 shows the spectral signature from a biopolymer sensor embedded with phenol red in accordance with another embodiment of the present invention. In this case, the biopolymer sensor is again implemented as a silk optical grating. As can be seen in FIG. 4, line 42 illustrates the absorbance of the biopolymer sensor when exposed to an acid of pH=3, and line 44 illustrates the absorbance of the biopolymer sensor when exposed to a base of pH=8. Line 46 of the graph 40 illustrates the non-zero differential signal between the two lines 42 and 44 representing the absorbance curves. Thus, the change of the spectral signatures of the biopolymer sensor in different pH solutions is clearly demonstrated as shown.

Figure 5A:
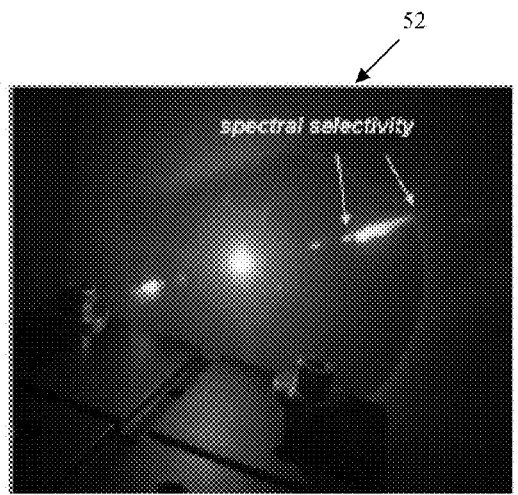
FIG. 5A is a photograph of a spectrum diffracted by a biopolymer sensor with embedded phenol red after immersion in a basic solution in accordance with another embodiment.
Figure 5B:
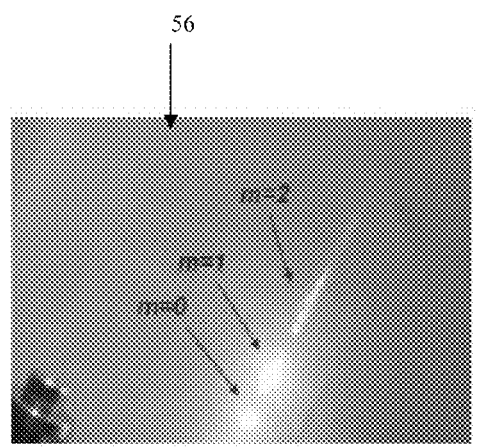
FIG. 5B is a photograph of a spectrum diffracted by a biopolymer grating fabricated from an undoped silk matrix.

FIGS. 5A and 5B illustrate a visible comparison of spectra diffracted by silk biopolymer gratings when exposed to supercontinuum radiation. Photograph 52 of FIG. 5A illustrates the spectrum diffracted by a biopolymer sensor fabricated as a silk optical grating that is embedded with phenol red after the biopolymer sensor is immersed in a basic pH=10 solution. Photograph 56 of FIG. 5B shows the diffracted spectrum of a silk grating that does not have any embedded biological material exposed to the same supercontinuum radiation. Spectral selectivity of green and blue bands is noticeable in the diffracted order of the biopolymer sensor with the embedded phenol red, shown in FIG. 5A, which is absent in the diffracted spectrum of the undoped silk grating shown in FIG. 5B.

Figure 6A:
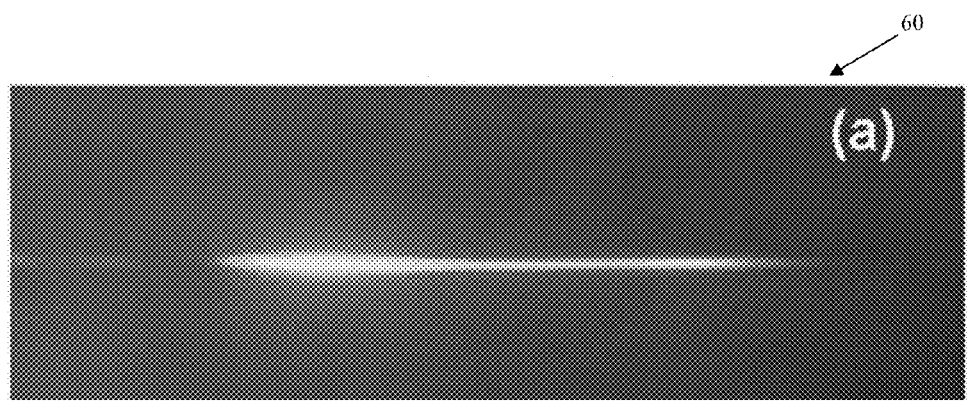
FIG. 6A is a photograph of a spectral image generated when supercontinuum light is transmitted through an undoped silk diffraction grating.
Figure 6B:
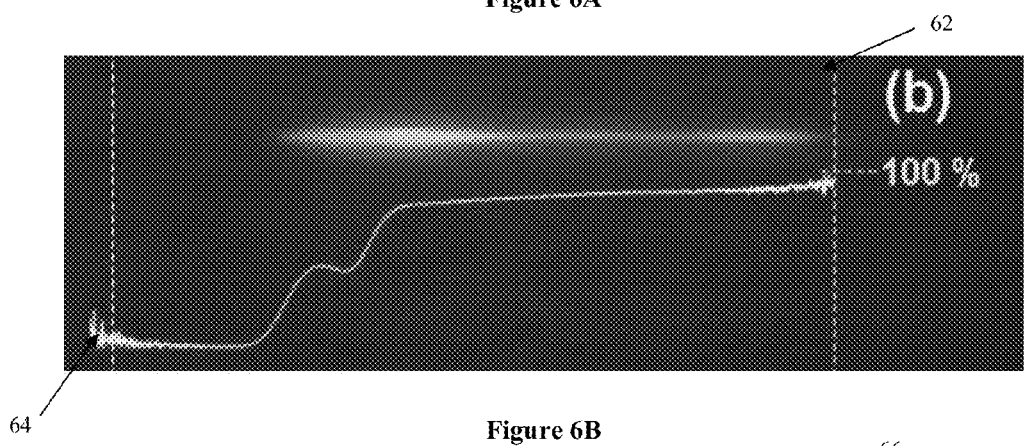
FIG. 6B is a photograph of a spectral image generated when supercontinuum light is transmitted through a biopolymer sensor fabricated from silk embedded with phenol red when exposed to an acid solution in accordance with one embodiment of the present invention.
Figure 6C:
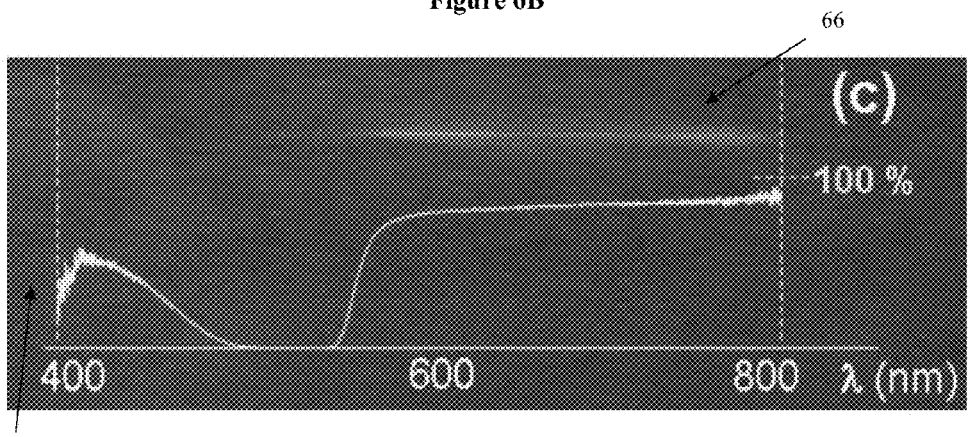
FIG. 6C is a photograph of a spectral image generated when supercontinuum light is transmitted through the biopolymer sensor of FIG. 6B when exposed to a base solution.

Results of another example experiment are shown in the spectral image photographs of FIGS. 6A through 6C in which supercontinuum light with wavelengths of 350 nm to more than 1,000 nm was transmitted through nanopatterned silk diffraction gratings. The spectral images were taken at a distance of 15 cm from the silk diffraction gratings. Photograph 60 of FIG. 6A illustrates the diffracted supercontinuum light when passed through an undoped nanopatterned silk diffraction grating and projected onto a fixed plane for reference purposes. Photograph 62 of FIG. 6B illustrates the diffracted supercontinuum light when passed through a biopolymer sensor in accordance with another embodiment of the present invention. This sensor is implemented as a nanopatterned silk diffraction grating embedded with phenol red, and the biopolymer sensor is exposed to an acid solution.

As can be seen by comparison of photograph 60 of FIG. 6A to photograph 62 of FIG. 6B, the spectral absorption of the biopolymer sensor implemented as a nanopatterned silk diffraction grating is changed by the embedding of phenol red and the exposure to the acid solution. In photograph 62, the measured spectral transmission curve 64 has also been overlaid to match the diffracted supercontinuum spectrum detected. Photograph 66 of FIG. 6C illustrates the diffracted supercontinuum when the phenol red embedded biopolymer sensor is exposed to a base solution instead of the acid solution. In addition, the measured spectral transmission curve 68 is also overlaid to match the diffracted supercontinuum spectrum detected. As can be seen by comparing the measured spectral transmission curve 64 with the transmission curve 68, more absorbance is exhibited toward the green end of the spectrum (that is to the shorter wavelengths) when the phenol red embedded biopolymer sensor is exposed to a base solution.

To confirm biocompatibility of the biopolymer sensors in accordance with the present invention, red blood cells (RBCs) with hemoglobin (the oxygen-carrying protein contained in RBCs) were incorporated into a nanopatterned silk diffraction grating in one example embodiment. This diffraction grating was manufactured in a manner described with regard to FIG. 1. In this regard, RBC-silk fibroin solution was prepared by combining 1 ml of an 80% hematocrit human RBC solution and 5 ml of the 8% silk solution. The mixture was cast on a 600 lines/mm optical grating substrate and allowed to dry overnight. The film was removed from the optical grating substrate and annealed for two hours. The grating structure was observed to remain present in the obtained resultant biopolymer sensor. In the present example, the resultant biopolymer sensor is an RBC embedded silk diffraction grating.

Figure 7:
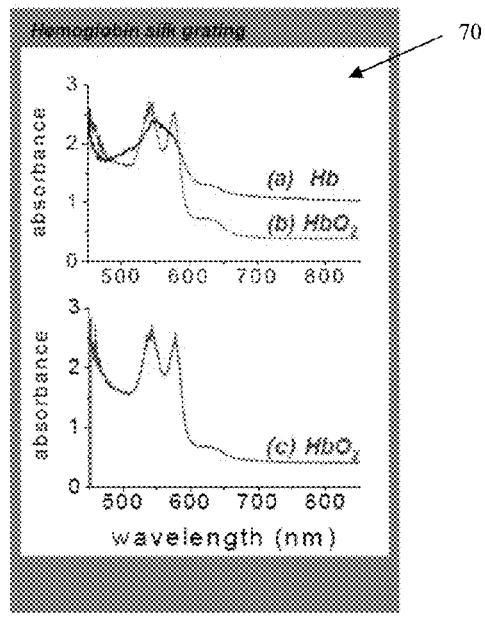
FIG. 7 illustrates results graphs that demonstrate the retention of hemoglobin function within the silk diffraction grating embedded with red blood cells.

The biopolymer sensor was then tested to observe the diffraction orders. To observe the diffraction orders, an optical transmission experiment was performed to determine whether the hemoglobin maintained its activity and functional capability within the matrix of the biopolymer sensor. The results graphs 70 are shown in FIG. 7 that demonstrate the retention of hemoglobin function within the RBC-embedded biopolymer sensor. In this regard, the X-axis corresponds to the wavelength (nm), and the Y-axis corresponds to the absorbance by the RBC-embedded biopolymer sensor.

In particular, the RBC-embedded biopolymer sensor was inserted in a quartz cuvette filled with distilled water, and an absorbance curve was observed. This result is shown by line (b) HbO2 in results graphs 70. As can be seen, the absorbance curve shown by line (b) HbO2 exhibited two peaks, which is typical of oxy-hemoglobin absorption. Subsequently, nitrogen gas was bubbled into the cuvette to deoxygenate the hemoglobin embedded within the biopolymer sensor. After 15 minutes, the characteristic absorption peaks of oxy-hemoglobin disappeared from the absorbance curve. This result is shown by line (a) Hb in the results graphs 70. These results were further confirmed when the nitrogen flow to the cuvette was subsequently halted, which resulted in the reappearance of the oxy-hemoglobin peaks. This result is shown by line (c) HbO2 in results graphs 70.

In view of the above, biopolymer sensors in accordance with the present invention, such as hemoglobin-embedded silk films, may be utilized as biopolymer oxygen detecting sensors. As outlined above, upon binding or removal of oxygen from the embedded hemoglobin, the optical characteristics and signature of the biopolymer sensor is changed, and such change can be detected, for example, by spectral diffraction or by direct observance.

Such biopolymer sensors may be especially useful as disposable sensors that can be placed in water systems or other environments to monitor water treatments or water quality, while eliminating the need to retrieve the samples afterwards, since they are biodegradable and biocompatible. Similarly, these sensors may be used as components of biomaterial scaffolding for a variety of applications in medicine and tissue engineering. For example, such biopolymer scaffolding provides improved oxygen detection, and may help control oxygen content to enhance cell and tissue regeneration.

In accordance another implementation of the present invention, biopolymer sensors implemented as nanopatterned silk gratings have also been cast with enzymes embedded therein to demonstrate the activity of the enzymes within the biopolymer sensor. In this regard, a variety of chromogens have been used to localize peroxidase in tissue sections. In particular, 8 wt % silk solution was combined with a horseradish peroxidase enzyme (HRP) to provide a 0.5 mg/ml concentration of the enzyme within the silk matrix solution. The matrix solution was then cast upon optical gratings with 600 and 2400 lines/mm on the surface of the grating. The matrix solution was also cast on a substrate having a Teflon™ coated surface. The cast films were allowed to dry. The formed biopolymer sensors that were cast on the optical gratings were annealed. Half of the formed biopolymer sensors that were cast on the Teflon™ coated substrate were also annealed. The annealing was performed for 2 hours in vacuum and water vapor. These biopolymer sensors were then dried after annealing, and the horseradish peroxidase reactivity to a reacting monomer was assessed as described below. The other half of the biopolymer sensors cast on the Teflon™ coated substrate that were not annealed were found to be of lower beta sheet content and dissolved upon application of the reacting monomer.

To verify enzyme activity, tetramethylbenzidine (TMB) was used to track functional enzyme activity in the biopolymer sensors implemented as nanopatterned silk gratings. TMB is an aromatic organic monomer that reacts with HRP and hydrogen peroxide to generate color in the presence of active enzymes via a free radical reaction. The oxidation products of TMB yield a characteristic blue color (one-electron oxidation) and a yellow color (two-electron oxidation).

Figures 8A, 8B, 8C, 8D:
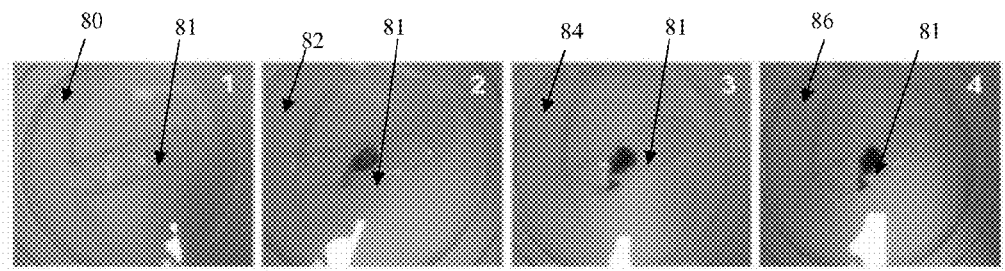
FIG. 8A is a photograph of the biopolymer sensor that is embedded with an enzyme in accordance with one embodiment of the present invention.
FIG. 8B is a photograph of the biopolymer sensor of FIG. 8A upon addition of reactants (TMB+peroxide).
FIG. 8C is a photograph of the biopolymer sensor of FIG. 8B during the course of reacting with the added reactants.
FIG. 8D is a photograph of the biopolymer sensor of FIG. 8B during the course of further reacting with the added reactants.
Figure 8E:
FIG. 8E is an enlarged photograph of the biopolymer sensor of FIG. 8D after completion of the reaction with the added reactants.

FIGS. 8A through 8D show photographs that illustrate a biopolymer sensor's reaction to TMB and peroxide, the biopolymer sensor being embedded with HRP as described above. In particular, the biopolymer sensor fabricated using silk and embedded with HRP was placed in a dish, and a few drops of TMB reagent were placed on the surface of the biopolymer sensor to react with the HRP enzyme. The activation of the TMB enzyme was evidenced by the visible color change, thereby demonstrating that the embedded biological material has maintained its functionality and provides a functionalized biopolymer sensor in accordance with another embodiment of the present invention. In particular, photograph 80 of FIG. 8A shows the biopolymer sensor 81 embedded with the HRP enzyme prior to any reaction. Photograph 82 of FIG. 8B shows the biopolymer sensor 81 shortly after addition of the TMB and peroxide reactants. Photographs 84 and 86 of FIGS. 8C and 8D, respectively, show various stages of the reaction of the embedded HRP enzyme in the biopolymer sensor 81. The reaction produces the yellow coloration (not shown) in the biopolymer sensor 81 in photograph 84. The green coloration (not shown) in biopolymer sensor 81 in photograph 86 is produced due to the presence of some unreacted monomer. FIG. 8E is an enlarged photograph 88 that shows biopolymer sensor 81 after completion of the reaction between the embedded HRP enzyme and the TMB and peroxide reactants.

Figure 9:
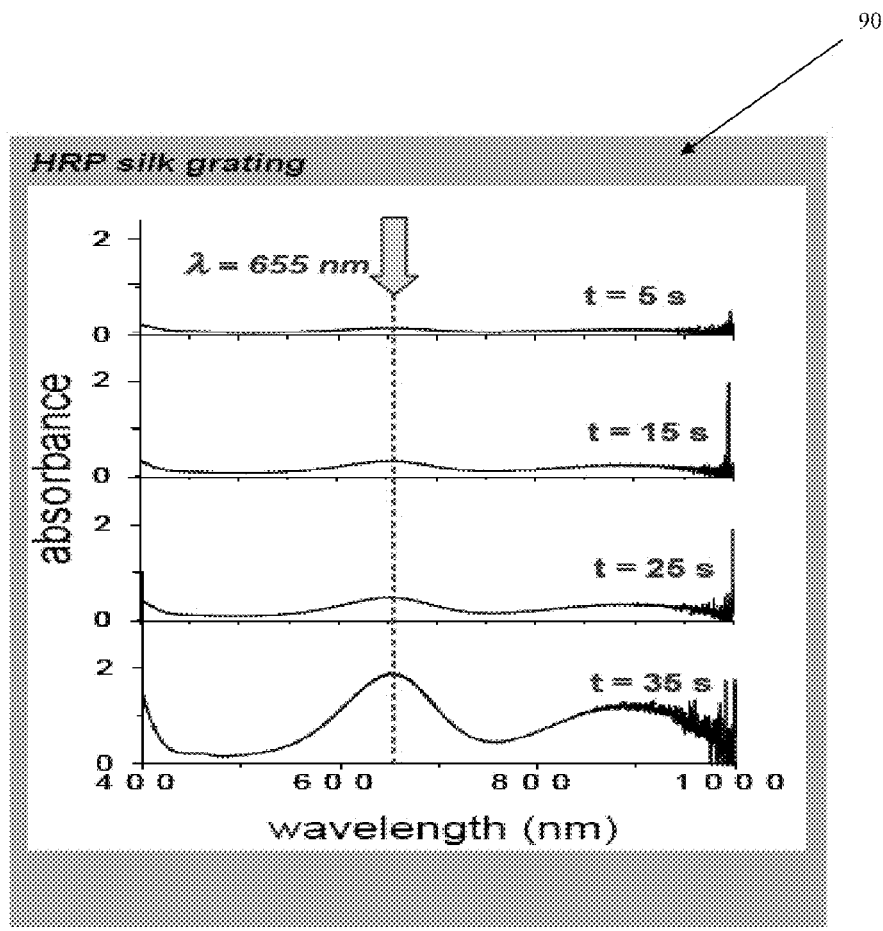
FIG. 9 is a results graph showing spectral absorbance of a biopolymer sensor embedded with horseradish peroxidase in accordance with another embodiment of the present invention.

Spectral evaluation of the enzyme activity was also performed on a biopolymer sensor implemented as a silk diffraction grating. The biopolymer sensor was embedded with HRP when exposed to TMB and peroxide, and the results are illustrated in graphs 90 of FIG. 9. In the graphs 90, the X-axis indicates the wavelength (in nm), and the Y-axis indicates the measured absorbance of the HRP-embedded biopolymer sensor. In particular, the series of time lapsed graphs 90 show the absorption spectra that was recorded at the initial stages of the reaction at 5, 15, 25, and 35 seconds, immediately after exposing the HRP-embedded biopolymer sensor to TMB and peroxide. As can be seen in the results graphs 90, the absorbance progressively increased in the 600 nm to 700 nm wavelength range, with the peak absorbance observed at approximately 655 nm, thereby verifying activity of the HRP enzyme. It should also be noted that these measurements shown in the results graphs 90 of FIG. 9 were taken 30 days after preparation of the HRP-embedded biopolymer sensor and after storing the biopolymer sensor at room temperature for this duration. The biopolymer sensor increased absorption of light at 655 nm as time progressed. These results clearly demonstrate that the embedded biological material maintained its functionality and provided a functionalized biopolymer sensor in accordance with one implementation of the present invention.

It is evident from the above examples that the functionality of the embedded biological material can be readily maintained within the biopolymer sensor in accordance with the present invention. By embedding biological materials such as proteins, peptides, DNA, RNA, enzymes, protein complexes, viruses, cells, antibodies, other biomolecules, dyes or other compounds, tissues, and other living materials or the like, into the biopolymer matrix during processing, functionalized active biopolymer sensors may be fabricated because the biologically active material survives the aqueous processing of fabrication of the biopolymer sensor.

If the embedded biological materials have a characteristic metabolic feature, a morphology, or are labeled with an indicator or marker protein (e.g., GFP as one of many examples), then a change in optical characteristic or signature of the biopolymer sensor will provide multi-mode sensing of analytes in the environment in which the biopolymer sensor is used. The change in optical characteristic or signature may be with or without a change in signal intensity from the indicator protein. Correspondingly, the biopolymer sensors of the present invention may be used as disposable toxicity screens, quick dip tests for water quality, air monitoring systems, and in many other related applications.

The level of hydration of a biopolymer sensor, such as a silk film with embedded biological material, may determine the stability of the resultant biopolymer sensors. As noted, the annealing of the biopolymer film may be performed in a water vapor environment. With humidifiers, and in some instances, without humidifiers, it is also feasible that these biopolymer sensors may be produced as large sheets. These fabricated large sheets may then be cut to size and distributed for use. Such techniques reduce the cost of manufacturing biopolymer sensors in accordance with the present invention. The biopolymer sensors of the present invention can be used for low cost water testing and environmental quality testing. Similar approaches can be used to manufacture coatings or coverings on the walls of rooms or in other systems to provide a more permanent detection capability inconspicuously. For example, the coatings or coverings may appear as a decoration or other fixture.

Figures 10A, 10B:
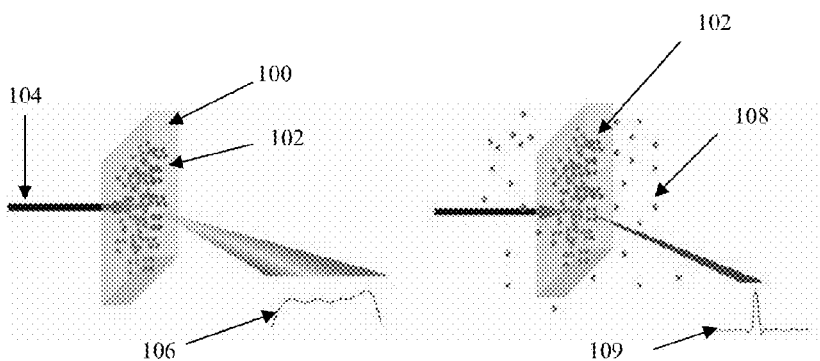
FIGS. 10A and 10B schematically illustrate the operation of a biopolymer sensor in accordance with another embodiment of the present invention.

FIGS. 10A and 10B schematically illustrate the operational principle of a biopolymer sensor in accordance with one embodiment the present invention where the biopolymer sensor is used as an environmental sensor. In particular, the biopolymer sensor 100 is implemented as an optical element, such as an optical grating, and includes embedded biological materials 102. Because the biopolymer sensor 100 is implemented as an optical element, it spectrally selects one specific color. As such, biopolymer sensor 100 exhibits a particular optical signature 106 or characteristic when light 104 is applied to it. As shown in FIG. 10B, the embedded biological materials 102 in biopolymer sensor 100 respond to the presence of materials or substances 108 in the environment and cause the optical signature 109, such as spectral color, to change as shown in FIG. 10B. The optical signature 109 includes spectral color. Moreover, as noted previously, the biopolymer sensor 100 may be implemented so that specific optical characteristics are enhanced for facilitating the indication of detected substances 108. Thus, the optical signature can be read out and analyzed, either directly or remotely, to provide a clear indication of the presence, or absence, of the particular substance to be detected.

Figure 11:
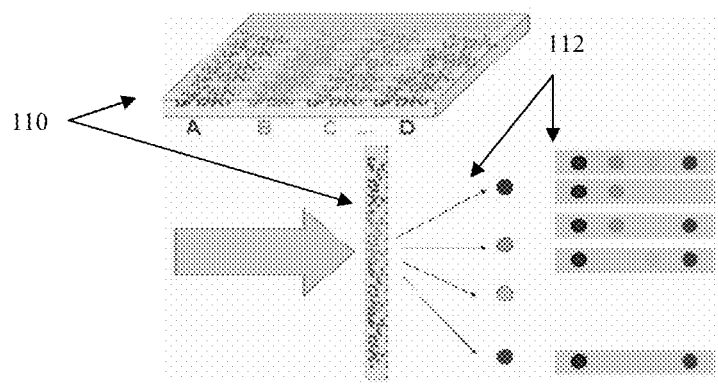
FIG. 11 schematically illustrates the operation of a biopolymer sensor in accordance with another embodiment of the present invention.

It should also be understood that the present invention is not limited to embedding of a single type of biological material in the biopolymer sensor. Instead, a plurality of different types of biological materials can be embedded in a single biopolymer sensor of the present invention to allow simultaneous detection of the presence of multiple materials or substances in a particular environment where the biopolymer sensor is used. In this regard, FIG. 11 also schematically illustrates a biopolymer sensor 110 in accordance with yet another embodiment of the present invention in which the principle of operation is further expanded to include a plurality of biological materials. As shown, a plurality of different types of biological materials 112A, 112B, 112C, and 112D (collectively referred to and illustrated in FIG. 11 as "biological materials 112"), are embedded in the various regions of biopolymer sensor 110 indicated as "A", "B", "C", and "D". Biopolymer sensor 110 may be implemented so that each type of biological materials 112 is adapted to spectrally select one specific color in a light spectrum and impact the spectral signature of the biopolymer sensor 110 differently when each of the particular substances are detected. Thus, the combination of different spectral signatures, and their arrangement in combination, allows the biopolymer sensor 110 to detect and indicate the presence of a multitude of substances and materials. The spectral signatures can then be read and analyzed and then compared to the expected spectral signature of the biopolymer sensor 110 embedded with biological materials. Again, such readings may be acquired, analyzed, and evaluated either at close range or remotely, as previously noted.

Figure 12A:
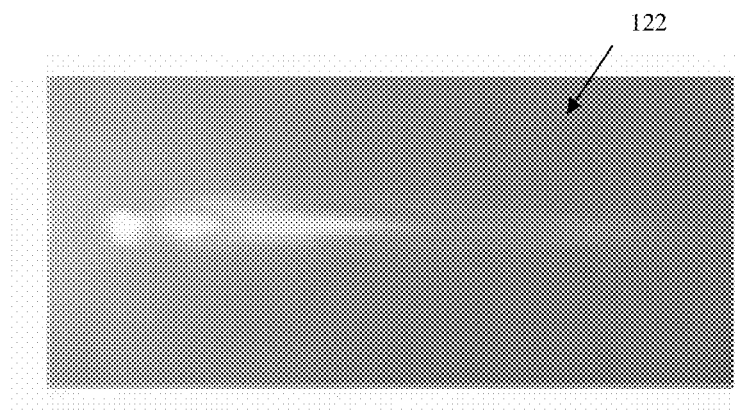
FIG. 12A is photograph showing the visible spectrum diffracted by a biopolymer sensor in accordance with another embodiment of the present invention.
Figure 12B:
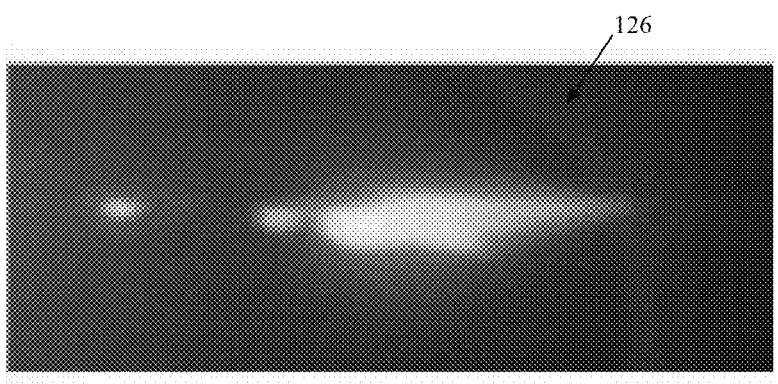
FIG. 12B is a photograph showing the visible spectrum diffracted by the biopolymer sensor of FIG. 12A in the presence of a base.

FIGS. 12A and 12B show results of yet another experimental demonstration of the above-described spectral selectivity. In particular, FIG. 12A is a photograph 122 showing the diffracted visible spectrum from a biopolymer sensor embedded with phenol red. FIG. 12B is a photograph 126 showing the diffracted visible spectrum when the biopolymer sensor is in the presence of a basic material. Different colored diffracted orders in the visible spectrum are observed when the biopolymer sensor is in the presence of a basic material, such difference being due to the fact that the embedded phenol red of the biopolymer sensor interacts with the basic material and visibly filters and selects specific spectral components, thereby providing observable difference in the diffraction. The dopant serves to filter the spectra while the grating selects the specific spectral components.

Thus, it should be apparent from the above that a biopolymer sensor in accordance with the present invention provides many advantages including combining the organic nature of biopolymers with the power of diffractive and transmissive optics provided in an organic matrix, and the creation of biologically active sensors. The silk biopolymers are controllably degradable, biocompatible, and structurally sound. The present invention further allows the biopolymer sensor to be implemented as an optical element that is optionally provided with highly defined nanoscale patterned structures on their surface, thereby allowing production of functionalized bio-optical elements.

The foregoing description of the aspects and embodiments of the present invention provides illustration and description, but is not intended to be exhaustive or to limit the invention to the precise form disclosed. Those of skill in the art will recognize certain modifications, permutations, additions, and combinations of those embodiments are possible in light of the above teachings or may be acquired from practice of the invention. Therefore the present invention also covers various modifications and equivalent arrangements that fall within the purview of the appended claims.

APPENDIX I

Antibody Stability in Silk Films

*Materials* - Anti-IL-8 monoclonal antibody (IgG1) was purchased from eBioscience, Inc. human polyclonal antibody IgG and human IgG ELISA Quantitation Kit were purchased from Bethyl Laboratories Inc. All other chemicals used in the study were purchased from Sigma-Aldrich (St. Louis, MO).

*Antibody entrapment in silk films - human polyclonal antibody IgG* – Ten ml 1mg/ml IgG mixed with 167 ml 6% silk solution make the IgG concentration in silk film mg/g silk. 100 µl of mixed IgG solution was added to each well of 96 well plate which was placed in a fume hood with cover opened overnight. The dried film was either treated or not treated with methanol. For methanol treatment, the wells were immersed in 90% methanol solution for 5 min and dried in the fume hood. All dry 96 well plates were then stored at 4°C, room temperature, and 37°C.

*Anti-IL-8 monoclonal antibody (IgG1)* - 0.5ml 1 mg/ml IgG1 mixed with 83 ml 6% silk solution make the IgG1 concentration in silk film 0.1 mg/g silk. 50 µl of mixed IgG1 solution was added to a well of 96 well plate which was placed in a fume hood with cover opened overnight. The dried film was either treated or not treated with methanol. For methanol treatment, the wells were immersed in 90% methanol solution for 5 min and dried in the fume hood. All dry 96 well plates were then stored at 4°C, room temperature, and 37°C.

*Antibody measurement* - Five wells prepared at the same condition were measured for statistic. Pure silk (without antibody) was used as a control.

For non methanol-treated samples, 100 µl of PBS buffer, pH 7.4, was added to the well which was further incubated at room temperature for 30 min to allow the film to completely dissolve. Aliquot of solution was then subjected to antibody measurement. For methanol-treated samples, 100 µl HFIP was added into each well which was further incubated at room temperature for 2 hours to allow the film completely dissolve. The silk HFIP solution was dried in a fume hood overnight. The follow step was the same as non methanol-treated samples, added PBS buffer and pipette the solution for antibody measurement.

*ELISA* - Polystyrene (96-well) microtitre plate was coated with 100 µL of antigen anti-Human IgG-affinity at a concentration of 10 µg/mL prepared in antigen coating buffer (bicarbonate buffer, 50 mM, pH 9.6) and then incubated overnight storage at room temperature. The wells were then washed three times with TBS-T buffer. The unoccupied sites were blocked with 1% BSA in TBS (200 µL each well) followed by incubation for 30 minutes at room temperature. The wells were then washed three times with TBS-T. The test and control wells were then diluted with 100 µL of serially diluted serum. Each dilution was in TBS buffer. Serially diluted blanks corresponding to each dilution were also present. The plate was then incubated for 1 h at room temperature. The plate was washed again with TBS-T buffer (five times). Bound antibodies were assayed with an appropriate conjugate of anti-human IgG-HRP (1:100,000), 100 µL of it was coated in each well and kept at room temperature for 1 hour. Washing of the plate with TBS-T (five times) was followed by addition of 100 µL TMB in each well and incubation at room temperature for 5-20 min. The absorbance of each well was monitored at 450 nm on a VersaMax microplate reader (Molecular devices, Sunnyvale, CA).

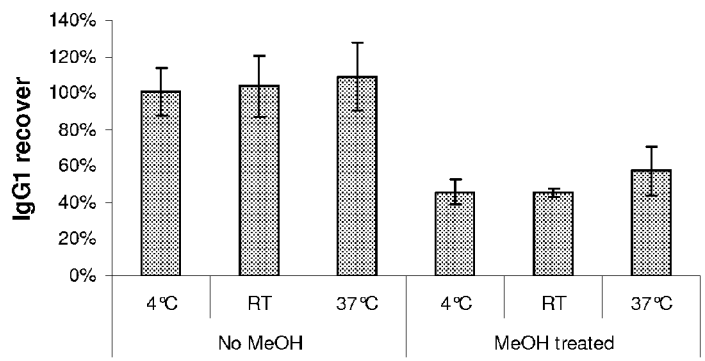

Figure A. Antibody IgG1 activity related to initial activity in the silk films prepared in the two different formats and stored at the three different temperatures.

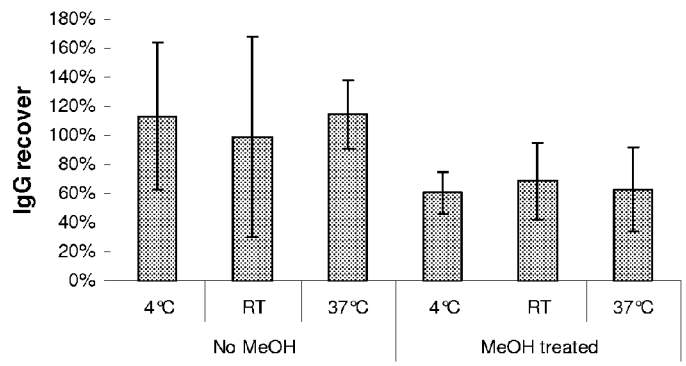

Figure B. Antibody IgG activity related to initial activity in the silk films prepared in the two different formats and stored at the three different temperatures.

APPENDIX II

Luminescent Silk Films

Potential Applications – Biosensors as well as novelty consumer items such as safe/edible toys, textiles for clothing or materials for decorations.

Methods –

*Film Preparation* - To prepare films, 1 mg/ml luciferase (from *Photinus pyralis* (firefly)) (Sigma) )solution was prepared and 1.5 ml was mixed with 21.4 ml 7% silk solution and cast into a film (in a well plate, placed in a hood overnight). After air drying, half of the film was treated with 90% methanol. All of the films were cut into small pieces (about 6×6 mm$^2$), weighed (about 8 mg each) and stored in 1.5 ml tubes.

Figure 2:
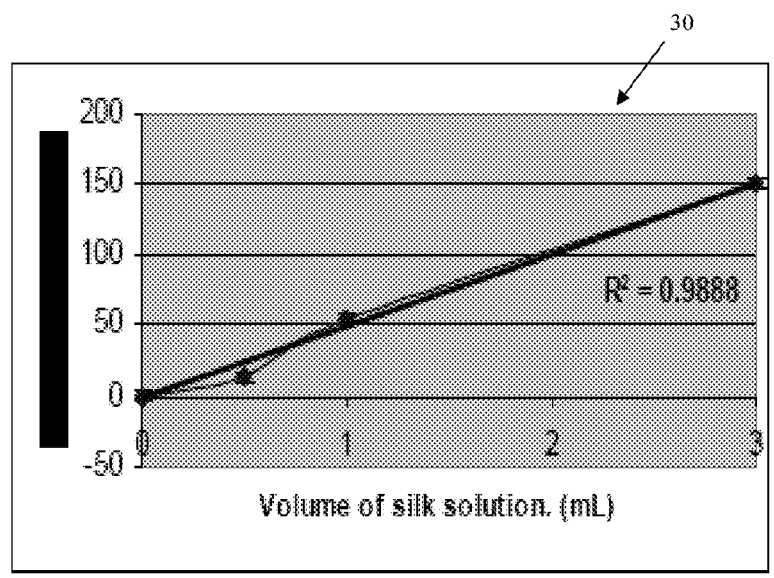
FIG. 2 is a graph that illustrates the relationship between the volume of 8% silk concentration vs. resulting thickness of a biopolymer film.

*Luciferase Reactions* - Once dry, the films were placed in a luciferin and ATP solution (500 μM D-salt luciferin, 8 mM ATP and 5 mM MgCl$_2$ in Tris-Cl buffer pH 7.6). Luminescence was measured from the emitted light upon diffusion of the reactants into the film. Luciferase from *Luciolamingrelica* (1.13.12.7, Sigma, solution in 25 mM Tris acetate, 5 mM MgSO$_4$, 1 mM EDTA, and 50% glycerol) was prepared in buffered aqueous glycerol solution and then used to cast the silk films. These silk films containing the luciferase were not soluble in water, likely due to the effect of glycerol. We are also using lyophilized powder of luciferase from *Photinus pyralis* (firefly) (Sigma) without glycerol present in the preparation, to compare results in terms of film stability and function. These films, without methanol treatment, dissolved in water with the firefly luciferase (Figure 2). Luciferase light activity is 5-30×10$^6$ light units/mg protein (*Photinus pyralis* (firefly), Sigma data).

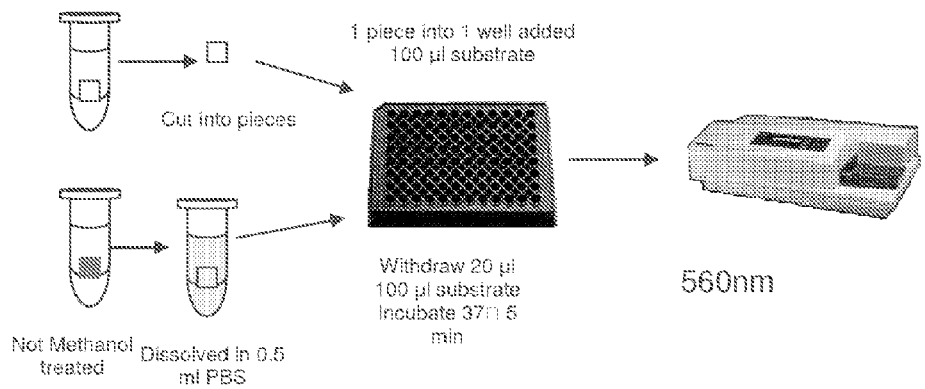

Figure C. Method to test luciferase activity. (luciferase assay kit – Biotium, Inc).

The reaction for the kit is as follows:

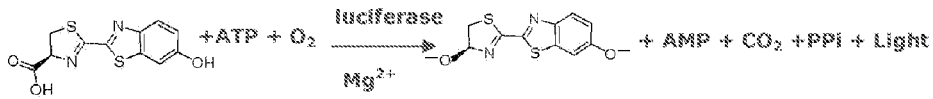

Figure D. Bioluminescence reaction equation.

For the non-methanol treated films, 0.5 ml lysis buffer (100 mM $K_2PO_4$, 0.2% Triton X-100, 1 mM DTT (dithiothreitol)) was added to dissolve the film. Twenty µl sample solutions were placed into black 96 well plates, 100µl substrate was added (the solution contained 500 µM D-salt luciferin, 8 mM ATP and 5 mM $MgCl_2$ in Tris-Cl buffer pH 7.6). The samples were incubated for 5 min and assayed at 560 nm for luminescent light emission (Figure E).

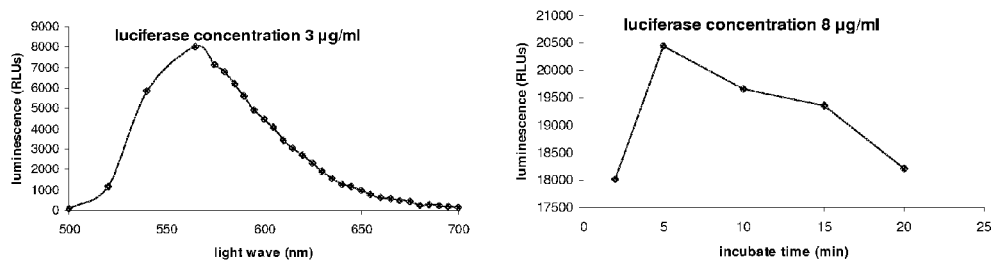

Figure E. Luminescence at different incubation times (Microplate reader, Molecular Devices Corporation).

For the methanol treated films, which cannot dissolve in water, the films were cut into 4 pieces (about 3×3 mm²) and one piece each was placed into a well of a black 96 well plate, then 100 ul of substrate was added to test luminescence at 560 nm after 5 min of incubation (37° C).

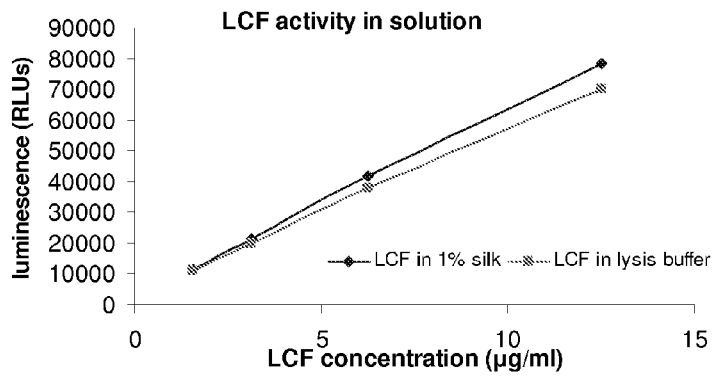

Figure F. Luciferase activity in solution after 5 min at 560 nm.

Figure F shows that LCF activity was not significantly changed in silk solution. To address this issue, different concentrations of luciferase in 1% silk solution and lysis buffer were prepared and then 20 µl solutions were added to 100 µl luciferase assay buffer of the luciferase assay kit, incubated 5 min at 37° C, and then assayed for light emission at 560 nm. These assays were performed to confirm that the silk-luciferase mixture did not result in deactivation of the enzyme.

Table 1. LCF activity remaining in silk films after film processing. N=5

| Luciferase activity remaining | no methanol | methanol treated |
|---|---|---|
| Initial addition(mg/g silk) | 1.0 | 1.0 |
| Assay in film (mg/g silk) | 0.42±0.23 | 0.017±0.002 |

Both the nonmethanol treated films that could be redissolved for assay and the methanol treated films that were assays as films.

Table 1 shows that the LCF remained at ~40% activity relative to the initial addition in the non-methanol treated silk films. There is about a 1.7% activity remaining relative to the initial addition in the non methanol treated silk film. Thus, luciferase activity is maintained in silk films during the preparation process.

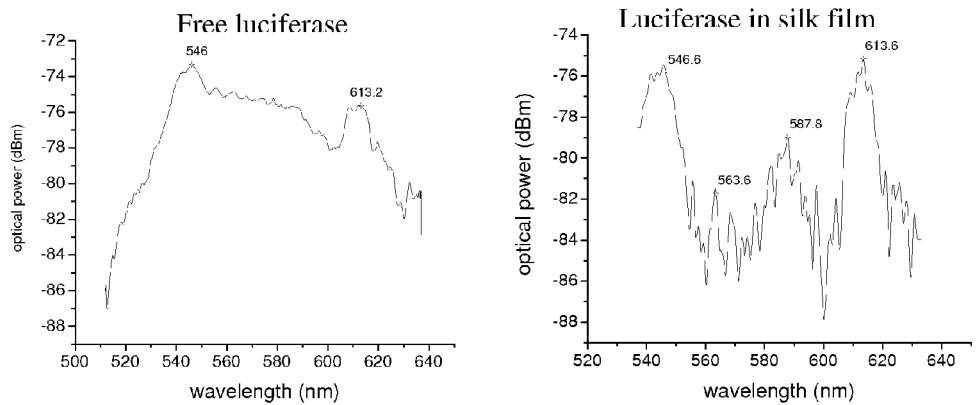

Figure F. . Emission spectra from free LCF in lysis buffer, and (right) from silk film. Luciferase concentration was 0.1 mg/ml in the film or solution and assays were run at room temperature in luciferase assay buffer.

The spectra above was acquired by coupling the light emitted from the solution and from the film into an Optical Spectrum Analyzer (Ando AQ6317 B). The coupling is carried out by recollimating the emitted light from the samples into the input port of the instrument in free space.

From Figures F it can be seen that light is emitted from the luciferin oxidizing reaction catalyzed by the luciferase. The emission peaks are 546 nm and 613 nm.

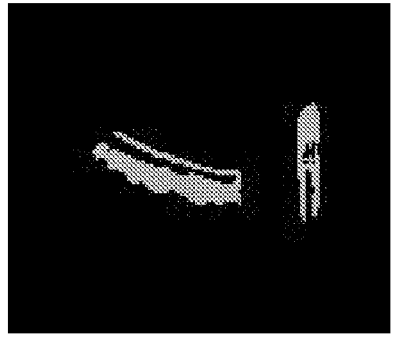
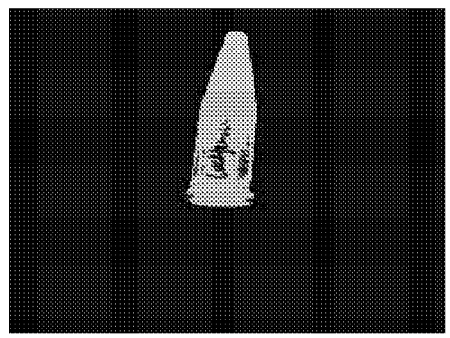

a. 30 second exposure of film          b. 5 min of tube( film is in tube)

Figure G. Photo of luminescent silk film (methanol treated film)

The Bio Imaging System (Synoptics Ltd) was used to image the films and samples in Figure F. The light emitted from the film was too weak to see by eye, while the solution was visible to the eye.

What is claimed is:

1. A method of manufacturing a biopolymer sensor comprising:
providing a substrate;
casting a biopolymer matrix solution on said substrate, said biopolymer matrix solution including a biopolymer and an added biological material; and
drying said biopolymer matrix solution with said added biological material to form a solidified biopolymer sensor on said substrate; and,
machining a nanopattern on a surface of said solidified biopolymer.

2. The method of claim 1, wherein said nanopattern includes an array of at least one of holes and pits.

3. The method of claim 1, wherein said machining of said nanopattern on said biopolymer film is performed using a laser.

4. The method of claim 3, wherein said machining is performed by femtosecond laser pulses generated by said laser.

5. The method of claim 1, further comprising:
providing said biopolymer; and
processing said biopolymer to yield said biopolymer matrix solution.

6. The method of claim 1, further comprising:
annealing said solidified biopolymer sensor.

7. The method of claim 6, wherein said annealing of said solidified biopolymer sensor is performed in at least one of a vacuum environment and a water vapor environment.

8. The method of claim 1, wherein said substrate includes a nanopatterned surface, and said biopolymer matrix solution is cast on said nanopatterned surface of said substrate so that said solidified biopolymer film is formed with a surface having a nanopattern thereon.

9. The method of claim 1, wherein said substrate is a template for an optical device.

10. The method of claim 9, wherein said substrate is a template for at least one of a lens, a microlens array, an optical grating, a pattern generator, and a beam reshaper.

11. The method of claim 1, wherein said biopolymer is silk.

12. The method of claim 11, wherein said biopolymer matrix solution is an aqueous silk fibroin solution having approximately 1.0 wt % to 30 wt % silk, inclusive.

13. The method of claim 12, wherein said aqueous silk fibroin solution has approximately 8.0 wt % silk.

14. The method of claim 1, wherein said biopolymer is selected from a group consisting of chitosan, collagen, gelatin, agarose, chitin, polyhydroxyalkanoates, pullan, starch (amylose amylopectin), cellulose, hyaluronic acid, and related biopolymers, or a combination thereof.

15. The method of claim 1, wherein said biological material is selected from a group consisting of red blood cells, horseradish peroxidase, and phenolsulfonphthalein, or a combination thereof.

16. The method of claim 1, wherein said biological material is selected from a group consisting of a nucleic acid, a dye, a cell, an antibody, enzymes, for example, peroxidase, lipase, amylose, organophosphate dehydrogenase, ligases, restriction endonucleases, ribonucleases, DNA polymerases, glucose oxidase, laccase, cells, viruses, proteins, peptides, small molecules, drugs, dyes, amino acids, vitamins, antioxidants, DNA, RNA, RNAi, lipids, nucleotides, aptamers, carbohydrates, chromophores, light emitting organic compounds such as luciferin, carotenes and light emitting inorganic compounds, chemical dyes, antibiotics, antifungals, antivirals, light harvesting compounds such as chlorophyll, bacteriorhodopsin, protorhodopsin, and porphyrins and related electronically active compounds, or a combination thereof.

* * * * *